United States Patent [19]

Ohki et al.

[11] Patent Number: 5,134,465
[45] Date of Patent: Jul. 28, 1992

[54] COLOR DETECTING CIRCUIT

[75] Inventors: Hideaki Ohki, Fujisawa; Masanori Kamiya, Yokohama, both of Japan

[73] Assignees: Hitachi Video Engineering, Inc., Yokohama; Hitachi, Ltd., Tokyo, both of Japan

[21] Appl. No.: 564,165

[22] Filed: Aug. 8, 1990

[30] Foreign Application Priority Data

Aug. 30, 1989 [JP] Japan .................................. 1-221453
Aug. 30, 1989 [JP] Japan .................................. 1-221454

[51] Int. Cl.⁵ ............................................. H04N 9/64
[52] U.S. Cl. ...................................... 358/27; 358/28; 358/29
[58] Field of Search .............................. 358/27, 28, 29

[56] References Cited

U.S. PATENT DOCUMENTS 3,678,182  7/1972  Boxman et al. ...................... 358/22
3,749,825  7/1973  Moore ................................. 358/22

Primary Examiner—James J. Groody
Assistant Examiner—Minsun Oh
Attorney, Agent, or Firm—Antonelli, Terry Stout & Kraus

[57] ABSTRACT

In the invention, in order to correct only the hue of specific region of color correction of an image processing circuit for a television receiver or the like, using color detecting means for detecting specific color, color signals are inputted and two arbitrary demodulation axes are obtained, and only negative component or positive component is extracted respectively from the output signals of the two means and the logic product of the extracted output signals is obtained. On the other hand, the output of the color detecting means is controlled in response to the signal level of the prescribed color signal, and then adding is performed to the prescribed color signal and the color correction is performed.

14 Claims, 5 Drawing Sheets

COLOR DETECTING CIRCUIT

BACKGROUND OF THE INVENTION

The present invention relates to a color detecting circuit which is favorably applied to color correction system of an image processing circuit of a television receiver or the like.

In the image processing, correction of color is frequently required. For example, in a television receiver or the like, because of relation of phase and gain of the demodulation axis being set and difference of the light emission spectrum of each fluorescent material of a cathode ray tube, emission of some specific color may become difficult.

Method of correcting only the hue of the specific region is as follows. That is, a specific color signal, for example, negative component $(-(R-Y))$ of $(R-Y)$ signal is extracted. On the other hand, signal level of a color signal other than $(R-Y)$, for example, negative component $(-(B-Y))$ of $(B-Y)$ signal is extracted. In response to the signal level, the gain control of the negative component $(-(R-Y))$ of the specific color signal extracted as above described is performed. The negative component $(-(R-Y))$ of the prescribed color signal subjected to the gain control is added to the prescribed color signal $(R-Y)$, thereby only the hue of the specific region can be corrected. In this example, when skin color is adjusted accurately, green color inclined to yellow green is corrected to color closer to green. Since the green color is inclined to yellow green, only component of $(R-Y)$ in the negative $(-)$ direction is amplified. In this case, in order to reduce the influence to other color, since the amplification factor (gain) of the negative component of $(R-Y)$ is controlled in response to the signal level of the negative component of $(B-Y)$, only the hue in some range among the hue of the third quadrant can be varied.

In this method, however, problems exist as follows.

In a first problem, since the color correction is performed in proportion to the amplitude of $(R-Y)$ and the amplitude of $(B-Y)$, the color correction is performed even at color with small amplitude, i.e., with low color saturation degree. In the case of color with low color saturation degree, since the noise component such as remaining carrier or color noise is predominant over the color component, the noise is emphasized by the color correction.

In a second problem, an output signal of an amplifier to control the gain becomes a specific color detection signal, for example, the negative component $(-(R-Y))$, and this color signal is added to the specific color signal $(R-Y)$ or not added thereto, thereby the color correction can be turned on or off. However, if the output offset exists in the amplifier to control the gain, the DC potential of the $(R-Y)$ output fluctuates by the ON/OFF operation of the color correction and therefore the white balance of the image fluctuates. This problem can be dealt with by adjustment of absorbing the output offset, but the adjustment is necessary.

In a third problem, the hue correction range becomes the phase range from the orthogonal phase of the $(R-Y)$ demodulation phase to the orthogonal phase of the $(B-Y)$ demodulation phase. That is, the phase range to enable the hue correction is determined with uniqueness by the demodulation phase of the color signal and arbitrary range cannot be set.

In a fourth problem, the negative component of $(R-Y)$ is increased and the $(R-Y)$ component is decreased in the hue correction range, thereby the $(G-Y)$ component is relatively increased and the emission of green is corrected. That is, since the color correction is of hue correction type, the color correction of the specific color with the low color saturation degree is not taken in consideration and therefore the color saturation degree cannot be corrected.

SUMMARY OF THE INVENTION

An object of the invention is to provide a color detecting circuit, where such problems in the prior art are eliminated and noise is not emphasized in the case of color with low saturation degree.

Another object of the invention is to provide a color detecting circuit, where even if output offset exists in the specific color detection signal, the white balance does not fluctuate by the ON/OFF operation of the color correction.

A further object of the invention is to provide a color detecting circuit, which can set any hue correction phase range.

Still another object of the invention is to provide a color detecting circuit, which can correct both the hue and the color saturation degree.

In order to attain the foregoing objects, the invention is provided with color detecting means for detecting specific color, level detecting means for generating output in response to signal of a prescribed color signal when the signal level is prescribed level or more, and control means for controlling the output of the color detecting means by the output of the level detecting means.

The prescribed color signal shall be a color signal obtained by means for providing any adjustment axis.

Since the output of the color detecting means is controlled by the output signal of the level detecting means of color signal, when the color signal is small, the output of the color detecting means can be inhibited. Thereby disadvantage of emphasizing the noise component included in the small signal can be eliminated. If the output offset exists in the output of the color detecting means, the white balance will fluctuate by the ON/OFF operation of the hue correction. The erroneous operation in this case is also eliminated by the operation of inhibiting the output of the color detecting means.

The invention is provided with two means for inputting color signals first and for obtaining arbitrary demodulation axes, two extracting means for extracting only the negative component or the positive component respectively of the output signals of the two means, and operational amplifier means for obtaining the logic product of the output signals of the two extracting means.

The signal to be inputted to one of the two extracting means shall be a prescribed color signal.

Since the color detecting range becomes the logic product part of the output signals of the two means for obtaining arbitrary demodulation axes, any range can be set by setting the demodulation axes. Also the color detecting signals can be added or subtracted in any ratio to any color channel, thereby both the hue and the color saturation degree can be corrected.

DETAILED DESCRIPTION OF THE PREFERRED EMBODIMENT

Figure 1:
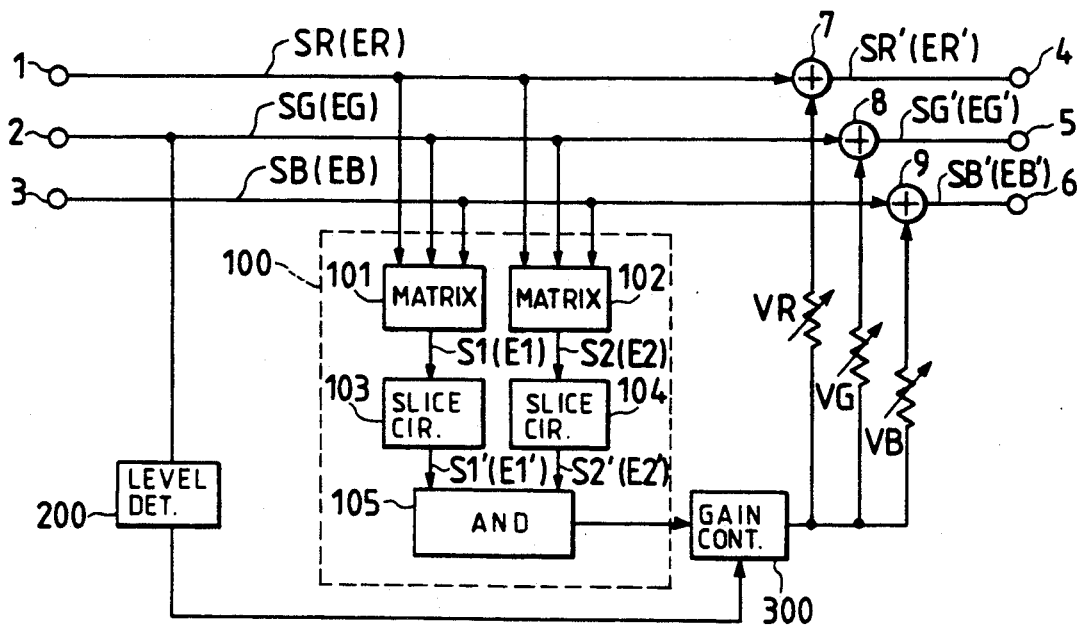
FIG. 1 is a block diagram showing an embodiment of a color detecting circuit according to the invention, being a system diagram illustrating an example applied to a television receiver.

FIG. 1 is a block diagram showing an embodiment of a color detecting circuit according to the invention. Numeral 100 designates a color detecting circuit, numeral 200 designates a level detecting circuit, and numeral 300 designates a gain control circuit. In FIG. 1, color signals SR, SG, SB of (R-Y), (G-Y), (B-Y) supplied to terminals 1, 2, 3 (amplitude level being ER, EG, EB) are supplied to adders 7, 8, 9, and also inputted to the color detecting circuit 100, thereby specific color is detected and a color detection output signal SA (amplitude level being EA) is obtained. The color detection output signal SA (amplitude level being EA) is supplied through means for setting the correction level, volumes VR, VG, VB in this example, to the adders 7, 8, 9, thereby color signals SR', SG', SB' with color correction (amplitude level being ER', EG', EB') are obtained in the output terminals 4, 5, 6 of the adders. In this example, the specific color to be detected shall be green. Next, the level detecting circuit 200 receives the color signals SG as input, and when the positive component level is the prescribed level or more, the level detecting circuit 200 generates output in response to the signal level and controls output of the color detecting circuit 100 by its output through the gain control circuit 300.

In the color detecting circuit 100, color signals are supplied to two matrix circuits 101, 102 to obtain the demodulation axis, and color components of S1, S2 of the demodulation axis (respective amplitude levels being E1, E2) are obtained to respective outputs of the two matrix circuits 101, 102 and supplied to two slice circuits 103, 104 respectively to extract negative components only, and negative components of S1', S2' (respective amplitude levels being E1', E2') only are extracted to respective outputs of the slice circuits 103, 104. The two extraction signals are supplied to operational amplifier means 105 to obtain logic product, and a specific color detection signal SA is obtained in the output of the operational amplifier means 105.

Figure 2:
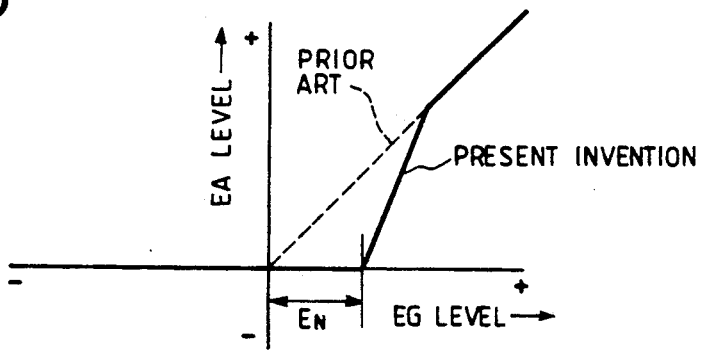
FIG. 2 and FIG. 3 are operation explanation diagrams of the embodiment.

FIG. 2 shows an example of gain control characteristics of the gain control circuit 300. In FIG. 2, the abscissa indicates the input level EG of the level detecting circuit 200, and the ordinate indicates the output level EA of the color detecting circuit 100. In the case of the prior art where the gain control is not performed, the EA level increases in proportion to the EG level. This is shown in dotted line of FIG. 2. Solid line shows characteristics where the gain control is performed according to the invention. That is, before the EG level becomes the EN level, the color detection output signal is inhibited, and when the EG level exceeds the EN level, the inhibiting is released gradually. According to the characteristics, when noise comparable to the EN level is inputted, the noise is not transmitted to the color detection output and therefore is not emphasized. Consequently, it follows that the dead zone of EN is provided.

Figure 3:
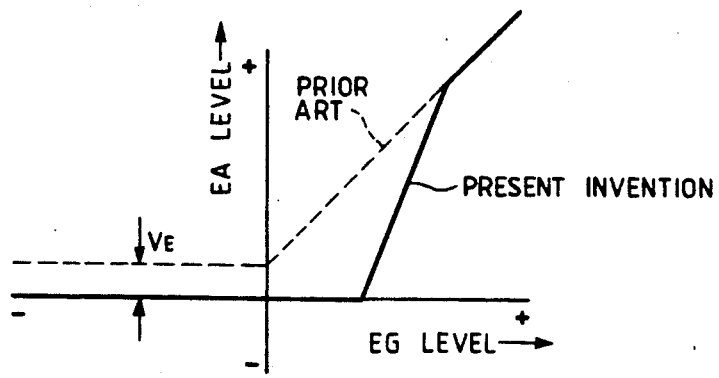

Next, FIG. 3 shows operation in the case that output offset exists in output of the color detecting circuit. The abscissa and the ordinate in FIG. 3 are the same as those in FIG. 2. In the case of the prior art, if output offset VE exists, since the color detection output EA is produced by VE even when the EG level is zero or less as shown in FIG. 3, the white balance fluctuates, but if the output is inhibited according to the gain control of the invention, the characteristics become as shown in solid line. Thereby the fluctuation of the white balance is eliminated.

Figure 4:
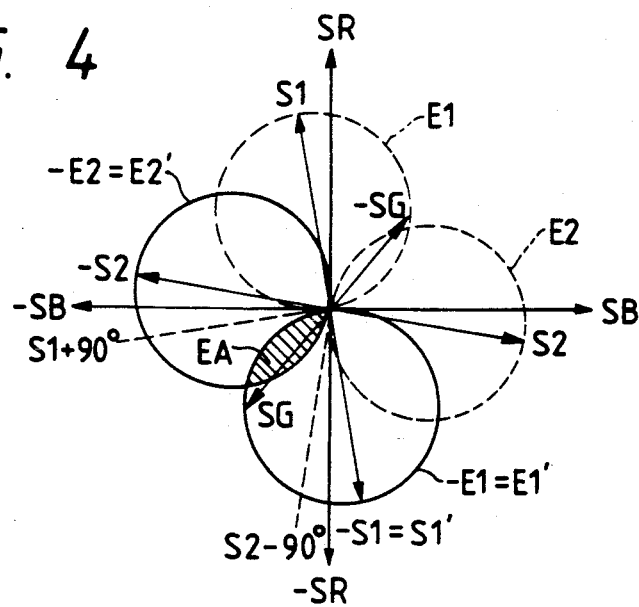
FIG. 4 is a hue vector diagram illustrating operation of the embodiment.

Next, operation will be described referring to FIG. 4 representing the hue. The demodulation axes of the color components S1, S2 obtained in the matrix circuits 101, 102 of FIG. 1 shall be set to S1, S2 in FIG. 4. This setting is the case that the detection color of the specific color is assumed green. In this case, if the color signal amplitude detected by the demodulation axis is expressed by the vector locus when any hue is inputted, the positive component becomes E1 and the negative component becomes −E1. That is, the color signal amplitude can be represented on FIG. 4 as the circle where the amplitude of the demodulation axis is the diameter. Also in the demodulation axis S2, the positive component becomes E2 and the negative component becomes −E2. Next, S1, S2 are supplied to the slice circuits 103, 104 to extract the negative component only, thereby the negative component signal amplitudes E1', E2' can be obtained. The amplitude component of the output signal SA of the operational amplifier circuit 105 to obtain the logic product of the two signals becomes the hatched portion EA in FIG. 4. In this case, the detection hue of the specific color detection signal SA becomes the hue region from (S1 demodulation angle +90°) to (S1 demodulation angle −90°) as shown in FIG. 4.

Figure 5:
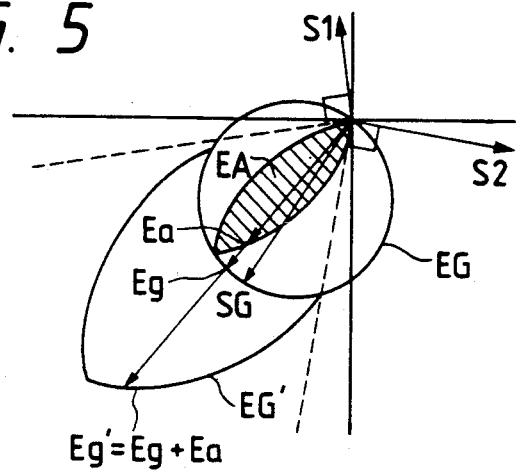
FIG. 5 and FIG. 6 are hue vector diagrams illustrating an example of color correction operation of the embodiment.
Figure 6:
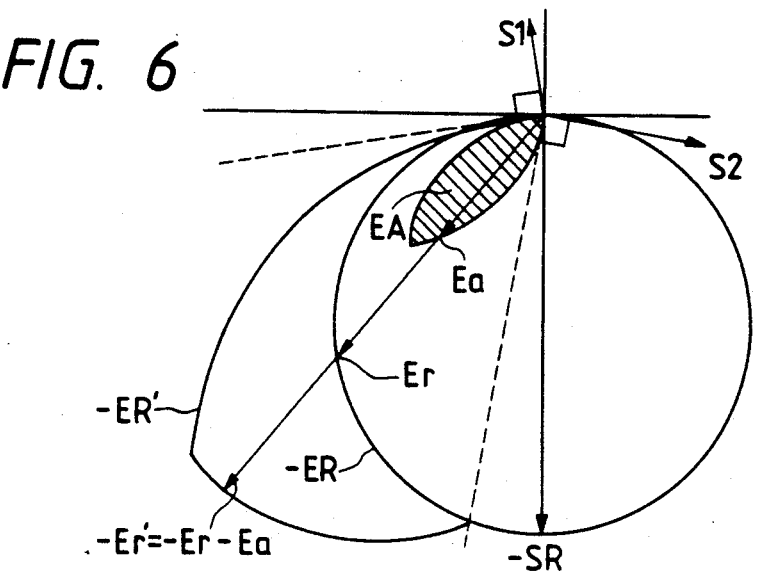

Next, the color correction operation using the specific color detection signal (green detection signal in this embodiment) SA obtained in the above procedure will be described. FIG. 5 shows operation of the color correcting adder 8 of the (G-Y) signal shown in FIG. 1. In FIG. 5, the demodulation axis of the (G-Y) signal is SG, and the vector locus of the positive component obtained from this demodulation axis is EG, and the amplitude component of the specific color detection signal is EA hatched in the FIG. 5. In the adder 8, assume that the signal SG and the signal SA be added in ratio of 1 to 1. In FIG. 5, when signal with hue to provide amplitude Eg at the signal SG is inputted, amplitude Ea is obtained at the signal SA and amplitude Eg' of the output of the adder 8 becomes (Eg+Ea). Consequently the color correction signal amplitude of the signal (G-Y) obtained at the terminal 5 of FIG. 1 becomes that shown by EG' in FIG. 4. FIG. 6 represents the case that the color correction operation of the signal (G-Y) is applied to the color correction of the signal (R-Y), and operation of the adder 7 in FIG. 1 is shown. In FIG. 6, (−Er') becomes amplitude by subtraction of Ea from (−Er), i.e., (−Er-Ea). Consequently, the color correction signal amplitude of the signal (R-Y) obtained at the terminal 4 of FIG. 1 becomes that shown by ER' in FIG. 6.

As clearly seen from FIG. 4 and FIG. 5, the hue correction region of both vector loci EG, ER is similar to the detection hue region of SA.

In the prior art in the case of signals (R-Y), (B-Y) of the demodulation axis shown in FIG. 4, the hue correction region becomes region from (−SB) to (−SR) shown in FIG. 4, for example, the correction region becomes too wide and may be corrected unnecessarily. In this embodiment, however, the specific color detection hue region can be set arbitrarily, and only the necessary hue can be corrected. Also the specific color detection signal is added to or subtracted from an arbitrary color signal, thereby correction of the color saturation degree becomes possible in addition to the correction of hue.

Figure 7:
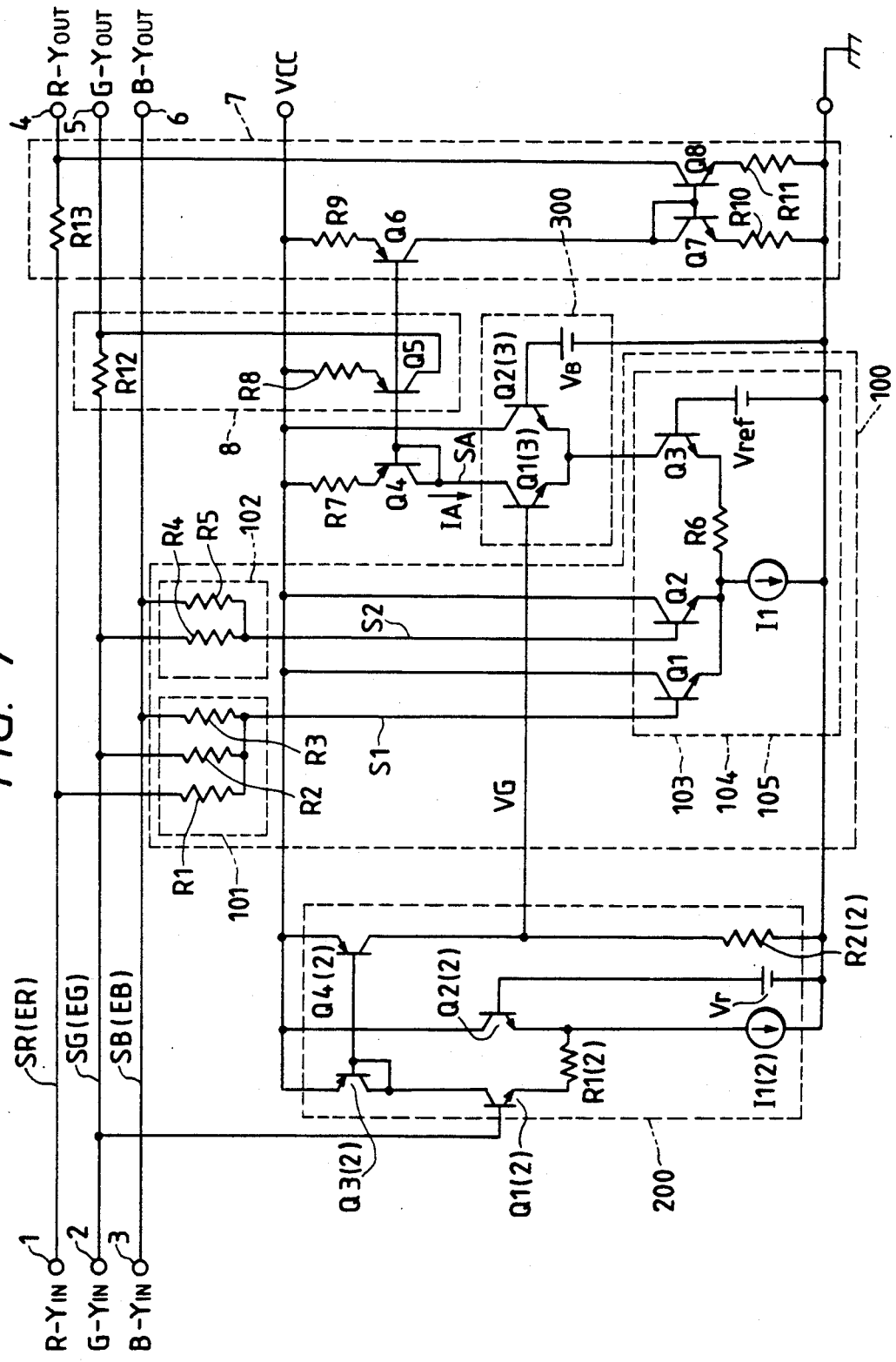
FIG. 7 is a circuit diagram showing concrete circuit constitution of FIG. 1.

FIG. 7 shows an example of a concrete circuit of FIG. 1.

The level detecting circuit 200 comprises transistors Q1(2), Q2(2), Q3(2), Q4(2), resistors R1(2), R2(2), a current source I1(2) and a reference voltage source Vr(2). The gain control circuit 300 comprises transistors Q1(3), Q2(3) and a reference voltage source VB. Parts corresponding to those in FIG. 1 are designated by the same reference numerals. In this example, the color detecting circuit 100 detects green color, and the detection output signal SA shall be detection current.

Operation by the color detecting circuit in such constitution is performed in that the color amplitude of the green color being the detection hue is detected by the differential pair constituted by the transistors Q1(2), Q2(2), and outputted as collector current of the transistor Q1(2), and detection output VG using the resistor R2(2) as a load resistor can be obtained by a current mirror circuit constituted by the transistors Q3(2), Q4(2). The detection output VG controls collector current of the transistor Q1(3) by the differential pair constituted by the transistors Q1(3), Q2(3) of the gain control circuit 300. In this case, since the collector current of the transistor Q1(3) is made the operation current source of the color detection current, if the positive amplitude of the green color is less than the setting level, the detection output VG is low voltage and the transistor Q1(3) cannot be turned on, thereby the output current of the color detection circuit output is inhibited. Also if the positive amplitude of the green color is more than the setting level, the transistor Q1(3) is turned on and the collector current of the transistor Q1(3) becomes IA, thereby the color detecting circuit 100 acts ordinarily.

Next, the two matrix circuits 101, 102, the two slice circuits 103, 104 and the operational amplifier means 105 in the color detecting circuit 100 will be described in detail.

The matrix circuit 101 comprises resistors R1, R2, R3, and the matrix circuit 102 comprises resistors R4, R5. The slice circuits 103, 104 and the operational amplifier circuit 105 to obtain the logic product comprise transistors Q1, Q2, Q3, a resistor R6, a current source I1, and a reference DC voltage source Vref of the color signal. The adder 8 comprises a current mirror circuit constituted by a transistor Q5 and a resistor R8, and a load resistor R12. The adder 7 comprises two sets of current mirror circuits constituted by transistors Q6, Q7, Q8 and resistors R9, R10, R11, and a load resistor R13. The output signal SA of the color detecting circuit is outputted as collector current of the transistor Q3.

The color correction operation by the color detecting circuit in such constitution is performed in that the color detection amplitude EA shown in FIG. 2 is applied across the resistor R6, and current flowing through the resistor R6 then becomes the color detection current IA and is outputted as collector current of the transistor Q3.

This current flows into the load resistor R12 by the current mirror circuit constituted by the transistors Q4, Q5. In this case, the correction voltage $V_{R12}$ produced across the load resistor R12 becomes $$V_{R12} = R12 \cdot a \cdot IA$$
$$= (R12/R6) \cdot a \cdot EA$$

Where "a" represents the current mirror ratio between the collector current of the transistor Q5 and the collector current of the transistor Q4. If R12=R6 and a=1, it follows that $$V_{R12} = EA$$

Therefore the characteristics become as shown in FIG. 3. Also if "a" is varied, the correction voltage can be set arbitrarily. This can be realized by setting the ratio between the resistor R7 and the resistor R8.

Also the color detection current IA flows out of the load resistor R13 by the two sets of the current mirror circuits constituted by the transistors Q4 and Q5, and the transistors Q7 and Q8 respectively. In this case, the correction voltage $V_{R13}$ produced across the resistor R13 becomes $$V_{R13} = (R13/R6) \cdot b \cdot c \cdot IA$$

Where "b" represents the current mirror ratio of the transistors Q5 and Q4, and "c" represents the current mirror ratio of the transistors Q8 and Q7. In similar manner to the above description, if R13=R6 and b=c =1, it follows that $$V_{R13} = EA$$

Therefore the characteristics become as shown in FIG. 6. Also in similar manner to the above description, if "b" and "c" are set arbitrarily by the gain control amplifier 300, the correction voltage can be set arbitrarily.

Figure 8:
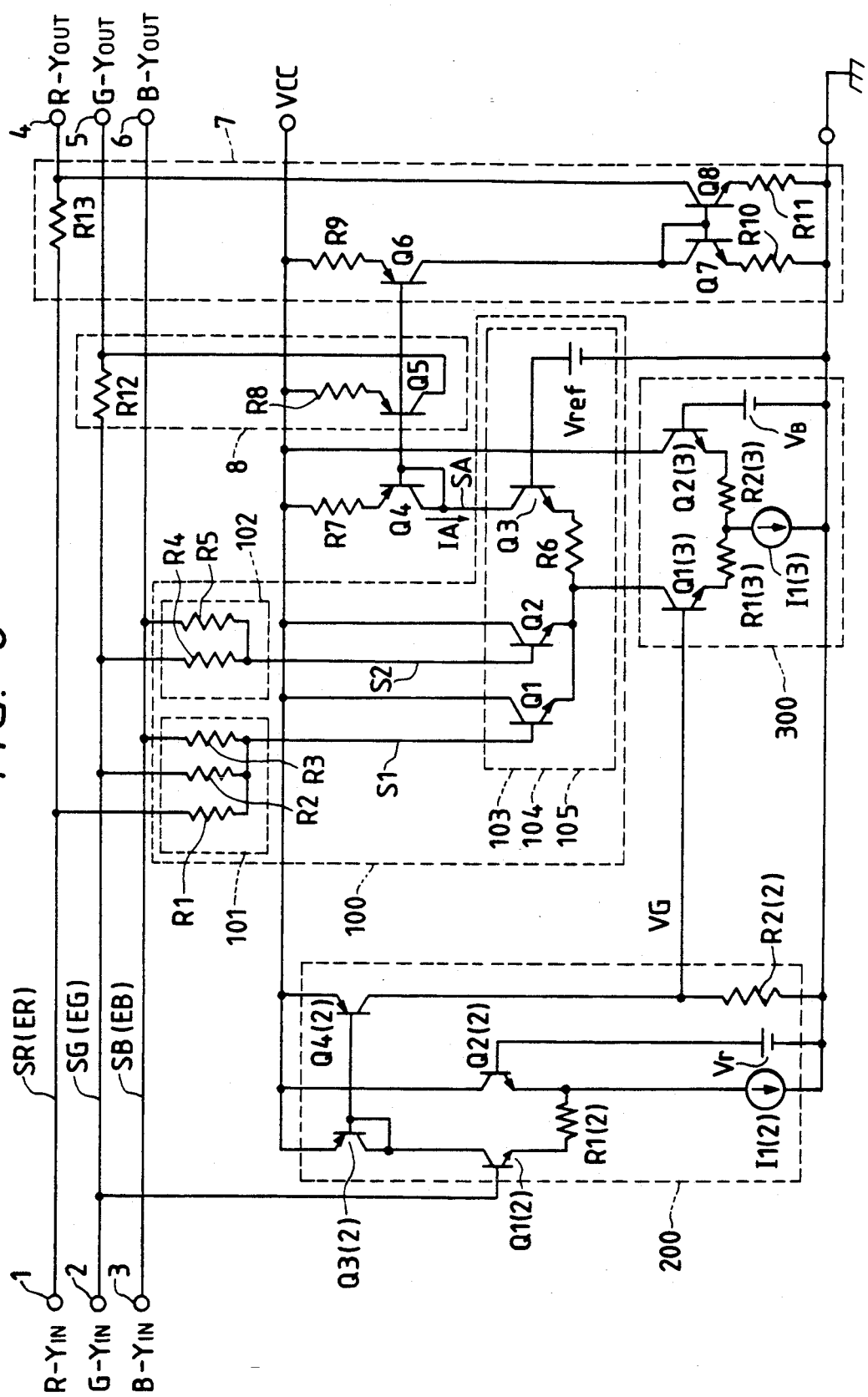
FIG. 8 is a circuit diagram showing other concrete circuit constitution of FIG. 1.

FIG. 8 shows another embodiment. FIG. 8 is different from FIG. 7 in the connection relation of the gain control amplifier 300. That is, the gain control amplifier 300 is connected to the position of the current source I1. Thereby the gain is varied in the form of modulating the current source I1.

Figure 9:
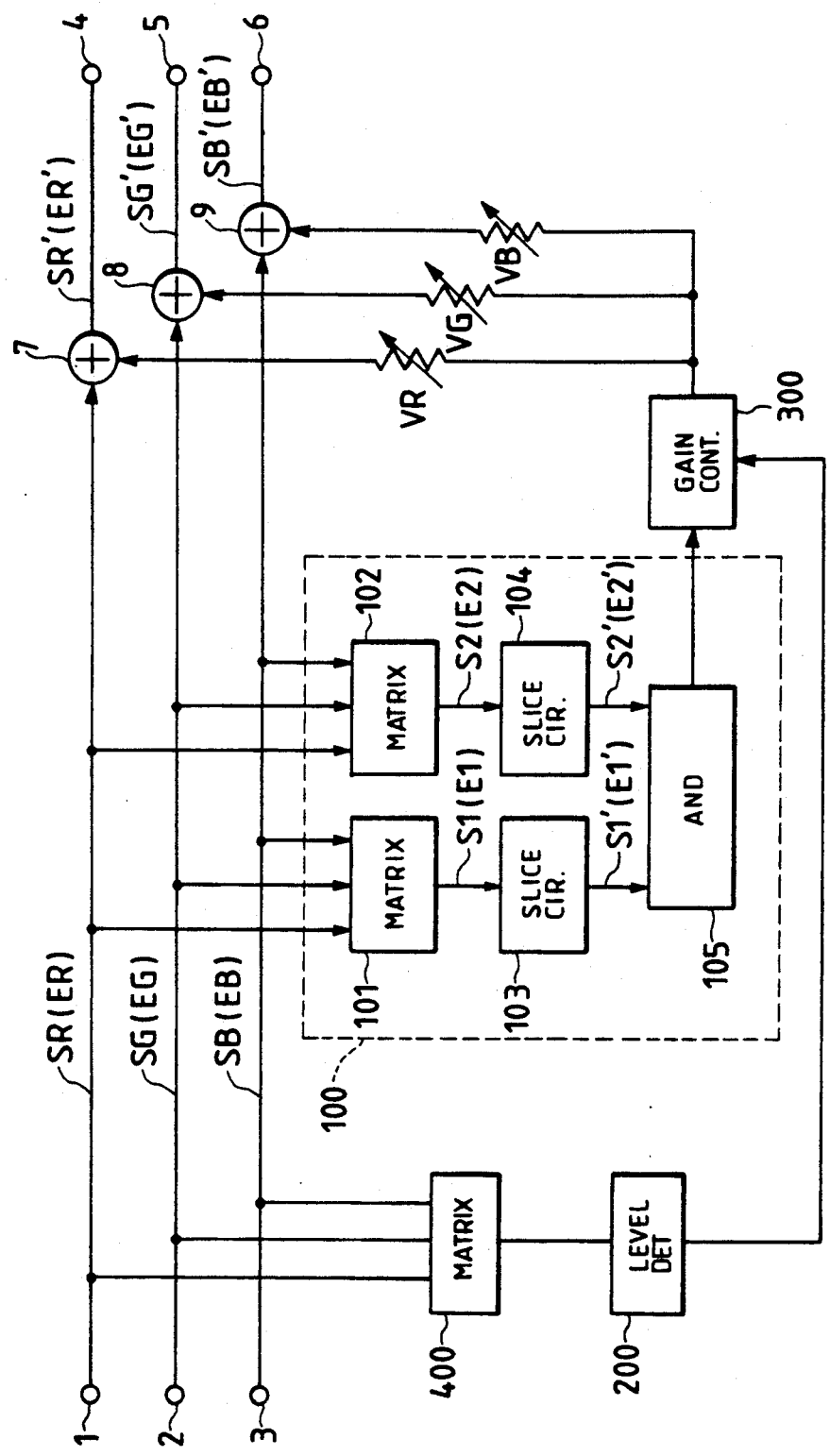
FIG. 9 is a block diagram showing another embodiment of the invention.

FIG. 9 is a block diagram showing another embodiment of a color detecting circuit according to the invention. In FIG. 9, numeral 400 designates a matrix circuit being means for obtaining any demodulation axis, and parts corresponding to those in FIG. 1 are designated by the same reference numerals. This example represents the case that the detection color of the color detecting circuit is made intermediate color such as skin color.

In the case of the intermediate color, the input signal of the level detecting circuit 200 must be made a color signal having the demodulation axis of the detecting hue. Consequently any signal of the color signals SR, SG, SB is inputted to the matrix circuit 400, and the demodulation axis of the necessary intermediate color is obtained and the signal is supplied to the level detecting circuit, thereby the same effect as that of FIG. 2 and FIG. 3 can be obtained even at the intermediate color.

According to the invention as above described, since the color detection output is inhibited for the color signal of small amplitude, noise component superposed to the color signal of small amplitude can be suppressed, thereby the noise is not emphasized when the color correction is performed.

Even when the output offset exists in the output of the color detecting circuit, the white balance does not fluctuate due to the action of inhibiting the output.

Although the fluctuation of the white balance can be eliminated by adjusting the output offset, the adjustment can be omitted according to the invention.

As shown in FIG. 7 and FIG. 8, since the color detecting circuit according to the invention can be realized in the circuit constitution where a capacitor and a coil are not used, the IC formation is easy, and the performance is stabilized and the cost is reduced by the IC formation.

According to the invention as above described, since color in any hue range can be detected, only the hue to be corrected can be selected and the correction can be performed and other color is not affected by the correction.

Also since the specific color can be detected, using this signal, arbitrary level can be corrected at arbitrary polarity to a plurality of color signals, thereby the color saturation degree can be corrected in addition to the hue correction of the specific color, and the specific color can be emphasized.

Also as shown in FIG. 7 and FIG. 8, since the color detecting circuit according to the invention can be realized in the circuit constitution where a capacitor is not used, the IC constitution is easy and the performance can be stabilized and the can be reduced by the IC formation.

What is claimed is:

1. A color detecting circuit comprising:
   color detecting means for receiving a color signal as input and detecting specific color;
   level detecting means for generating output in response to a signal level of a prescribed color signal when the signal level is a prescribed level or more;
   control means for controlling the output of said color detecting means by the output of said level detecting means; and
   means for adding the controlled output of said color detecting means to the color signal.

2. A circuit as set forth in claim 1, wherein the prescribed color signal is color component obtained by means for obtaining any demodulation axis.

3. A circuit as set forth in claim 1, said level detecting means comprising a pair of transistors and a current mirror circuit,
   wherein base of one transistor is inputted by a prescribed color signal and base of other transistor is connected to a reference power source, and the signal is detected as collector current of one transistor by the differential pair and the detection output is obtained from a load resistor of said current mirror circuit.

4. A circuit as set forth in claim 1, said control means comprising a pair of transistors,
   wherein base of one transistor is inputted by output of said level detecting means and base of other transistor is connected to a reference power source, and output of said color detecting means is inputted to common emitter of the differential pair thereby the controlled color detection signal is obtained as collector current of one transistor.

5. A circuit as set forth in claim 1, said control means comprising a pair of transistors,
   wherein base of one transistor is inputted by output of said level detecting means and base of other transistor is connected to a reference power source, and output of said color detecting means is inputted to collector of one transistor thereby the controlled color detection signal is obtained as common emitter current of the differential pair.

6. A circuit as set forth in claim 1, wherein said adding means performs adding to a plurality of color signals.

7. A circuit as set forth in claim 1, wherein said adding means performs adding to the color signal at arbitrary polarity.

8. A circuit as set forth in claim 1, said color detecting circuit comprising:
   means for receiving a color signal and obtaining first demodulation axis;
   means for receiving a color signal and obtaining second demodulation axis;
   first and second extracting means for extracting only negative component or positive component respectively from color components obtained by said two means for obtaining the demodulation axes; and
   operational amplifier means for obtaining the logic product of signals extracted by said two extracting means.

9. A circuit as set forth in claim 8, wherein the color component to be inputted to said first extracting means is a prescribed color signal.

10. A color detecting circuit comprising:
    color detecting means for receiving a color signal as input and detecting specific color;
    level detecting means for detecting a signal level of a prescribed color signal; and
    control means having a dead zone and being responsive to an output of said level detecting means other than within the dead zone for controlling the output of said color detecting means in accordance therewith.

11. A color detecting circuit comprising:
    means for receiving a color signal and obtaining first demodulation axis;
    means for receiving a color signal and obtaining second demodulation axis;
    first and second extracting means for extracting only negative component or positive component respectively from color components obtained by said two means for obtaining the demodulation axes;
    operational amplifier means for obtaining the logic product of signals extracted by said two extracting means; and
    means for adding the output of said amplifier means to the color signal.

12. A circuit as set forth in claim 11, wherein the color component to be inputted to said first extracting means is a prescribed color signal.

13. A circuit as set forth in claim 11, wherein said adding means performs adding to a plurality of color signals.

14. A circuit as set forth in claim 11, wherein said adding means performs adding to the color signal at arbitrary polarity.

* * * * *